(12) United States Patent  
Terry

(10) Patent No.: US 6,474,013 B2
(45) Date of Patent: Nov. 5, 2002

(54) FISHING-HOOK HOLDER AND THREADING DEVICE

(76) Inventor: William R. Terry, 3530 E. Janice St., Long Beach, CA (US) 90805-3954

( * ) Notice: Subject to any disclaimer, the term of this patent is extended or adjusted under 35 U.S.C. 154(b) by 0 days.

(21) Appl. No.: 09/776,347

(22) Filed: Feb. 2, 2001

(65) Prior Publication Data

US 2002/0104253 A1 Aug. 8, 2002

(51) Int. Cl.$^7$ .............................................. A01K 97/06
(52) U.S. Cl. ........................................ 43/57.1; 43/25.2
(58) Field of Search ............................. 43/57.1, 54.1, 43/25.2, 57.2, 43.11, 43.1, 43.16; D22/134, 144

(56) References Cited

U.S. PATENT DOCUMENTS

| | | | |
|---|---|---|---|
| 578,458 A | 3/1897 | Knieriemen | |
| 685,952 A | 11/1901 | Sullivan | |
| 1,888,304 A | 11/1932 | Bekeart | |
| 2,499,042 A | * 2/1950 | Vogel | 43/57.1 |
| 2,710,482 A | * 6/1955 | Vogel | 43/57.1 |
| 2,734,306 A | 2/1956 | Holdeman | |
| 3,430,379 A | 3/1969 | Wolfrum | |
| 3,464,143 A | * 9/1969 | Scott | 43/57.1 |
| 3,645,419 A | * 2/1972 | Shorrock | 43/44.91 |
| 3,800,456 A | * 4/1974 | Rowe | 43/25.2 |
| 4,414,771 A | * 11/1983 | Martin | 43/4 |
| 4,468,882 A | * 9/1984 | Marusak | 43/57.1 |
| 4,631,856 A | * 12/1986 | Born | 43/57.1 |
| 4,757,637 A | * 7/1988 | Christensen | 43/57.1 |
| 4,769,941 A | 9/1988 | Schmidt | |
| 4,884,357 A | 12/1989 | Clifford | |
| 5,123,199 A | 6/1992 | Lysohir et al. | |
| 5,220,742 A | 6/1993 | Lewis | |
| 5,269,090 A | 12/1993 | Richards et al. | |
| 5,440,829 A | 8/1995 | Parvin | |
| 5,501,030 A | 3/1996 | Markle | |
| 5,600,917 A | * 2/1997 | Manno | 43/44.82 |

FOREIGN PATENT DOCUMENTS

| | | | | |
|---|---|---|---|---|
| FR | 2551320 A1 | * 3/1985 | | 43/57.1 |
| WO | WO-8911791 A1 | * 12/1989 | | 43/57.1 |

* cited by examiner

*Primary Examiner*—Charles T. Jordan
*Assistant Examiner*—David Parsley
(74) *Attorney, Agent, or Firm*—Stetina Brunda Garred & Brucker

(57) ABSTRACT

Apparatus for holding a fishing-hook while facilitating the threading of fishing-hooks. In an exemplary form, the invention includes a clam-shell housing, the housing having a pair of opposing first and second blocks, a pair of opposing first and second surfaces, with the first surface in the first block and the second opposing surface in the second block. The embodiment further includes at least one aperture formed at a periphery of at least one of the opposing surfaces and at least one hook-receiving channel to receive and fixedly engage the fishing hook, the channel being etched into the same opposing surface as the aperture and substantially shaped in form of the fishing-hook, with channel connected at one end to the aperture and extending thereof inwardly along the etched surface. In this way, a fishing-hook is firmly held by the housing, thus facilitating the threading of the hook.

19 Claims, 2 Drawing Sheets

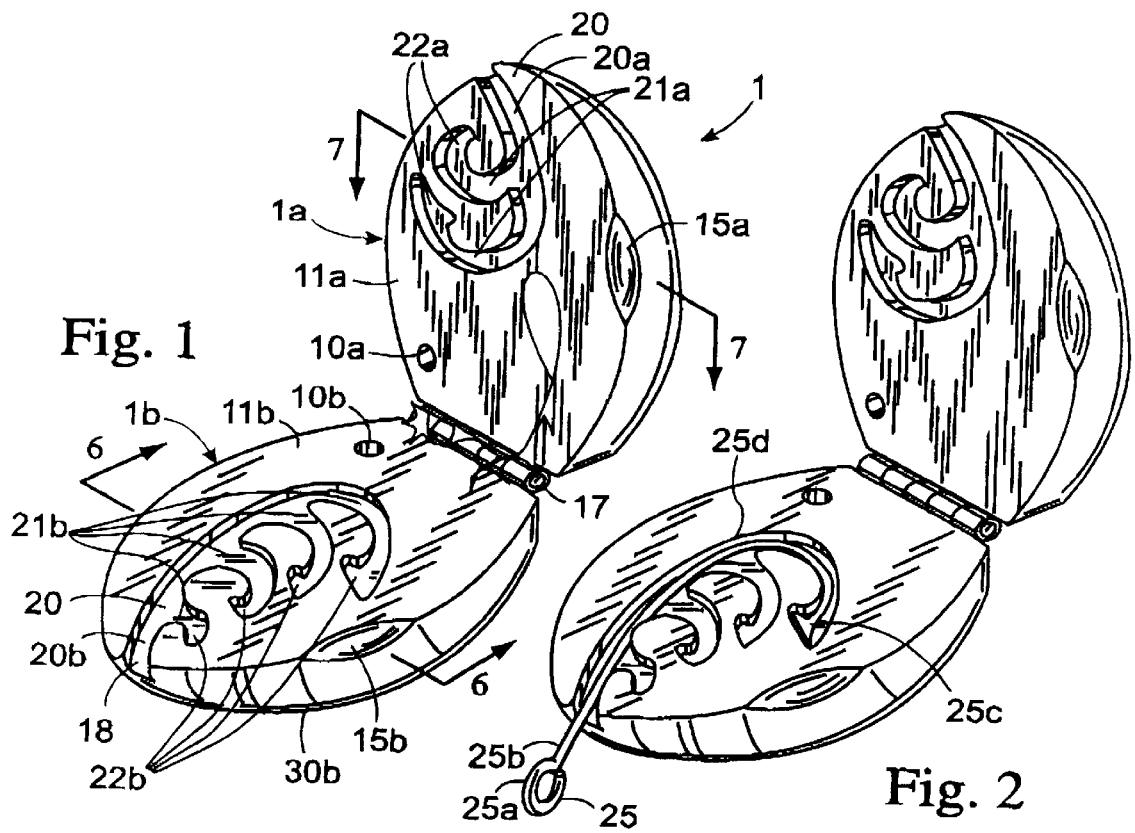
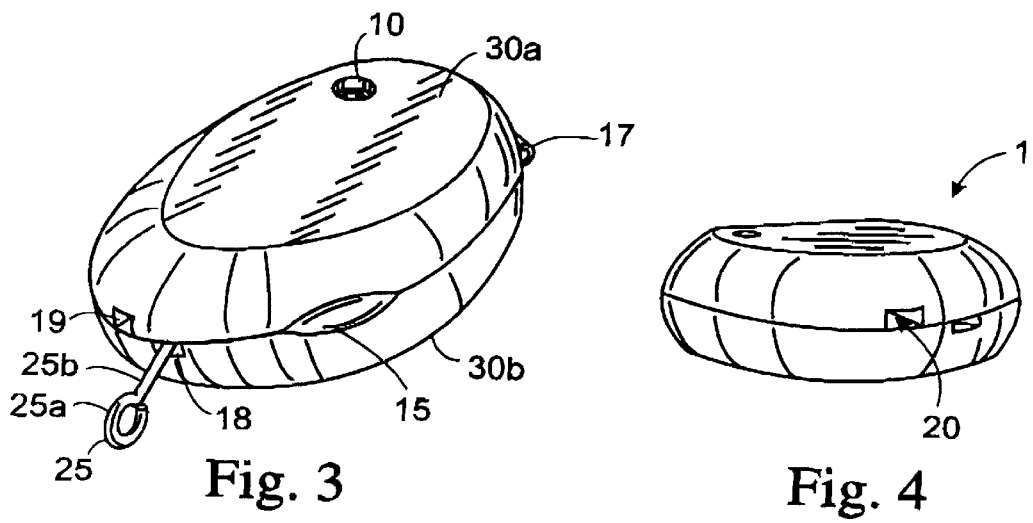

FISHING-HOOK HOLDER AND THREADING DEVICE

CROSS-REFERENCE TO RELATED APPLICATIONS (Not Applicable)

STATEMENTS RE: FEDERALLY SPONSORED RESEARCH/DEVELOPMENT (Not Applicable)

1. Field of the Invention

The present invention is directed to the field of fishing. More particularly, the present invention is directed to devices for holding and threading of fishing-hooks.

2. Background of the Invention

Presently, the potential danger from handling of fishing-hooks is well known to fish-hook users. Generally, fishing-hooks have a barb portion at where the bait is often optimally placed. The barb portions also have sharpened outwardly pointed edges for the purpose of engaging the prey. Once the prey has swallowed the bait, these sharpened portions pierce and tear into the prey's mouth and engage the tissue therein, thus reducing the chance of the prey's escape prior to its capture.

While the barb's sharpened edges have proven effective in their intended role of piercing and tearing into the prey's tissue in order to engage the prey, they have also been the source of inadvertent injury to the users of fishing-hooks. In many instances, the barb's sharpened edges have torn into the flesh of the user's fingers and hand while being held. This problem specifically widespread when the user is trying to hold the fishing-hook in a steady position with one hand while attempting to thread the eye of the hook with the other hand.

Currently, many devices exist to minimize the threat of injury to the users. These devices, however suffer from several shortcomings. First, most such devices are constructed of several moving parts and other gadgets, making them difficult to hold or use. Second, these devices generally were built with the intention of merely providing storage or a carrying case for the hook and not as a threading facilitator. They thus do not adequately hold the hook in position, allowing for the hook to move or rattle within the device and making it difficult for a user to thread the eye. Third, these devices are often cumbersome to use when it comes to the insertion and retrieval of the fishing hook, often causing injuries to the user in the process. Fourth, most such devices are limited a single fishing-hook of a specific size, thus requiring the user to utilize a number of such devices in order to accommodate fishing hooks of different sizes.

It is therefore an object of the present invention to provide a device that would readily receive a fishing-hook and fixedly engage the hook in a snug surrounding so that the movement of the hook is minimized.

It is another object of the present invention to provide a device that is readily capable of receiving fishing-hooks of different sizes and shapes, thus minimizing the need to utilize more than once such device.

It is yet another object of the present invention to provide a method for facilitating the threading of a fishing hook.

SUMMARY OF THE INVENTION

These and other objects are achieved by the various apparatus and associated method of the present invention. In a broad aspect, the present invention provides a fishing-hook holder and threading device to hold and restrict the movement of a fishing-hook during threading. In a first exemplary embodiment, the present invention includes a clam-shell housing for a fishing-hook, the housing having a pair of opposing first and second surfaces, with the first opposing surface in a first block and the second opposing surface in a second block. The first embodiment further includes that at least one aperture formed at a periphery of at least one of the opposing surfaces and at least one hook-receiving channel to receive and fixedly engage the fishing hook, the channel being etched into the same opposing surface as the aperture and substantially shaped in form of the fishing-hook, with channel connected at one end to said aperture and extending thereof inwardly along said etched surface. In a second exemplary embodiment, the present invention is an apparatus to hold and restrict the movement of fishing-hooks of varying sizes during threading. The invention includes a clam-shell housing for a plurality of fishing hooks, the housing having a pair of opposing first and second blocks, a pair of opposing first and second surfaces, with the first opposing surface in the first block and the second non-opposing surface in the second block. The second embodiment further includes at least one aperture formed at a periphery of each of the opposing surfaces, and at least one hook-receiving channel etched in each of the opposing surfaces in the substantial shape of a fishing-hook, the channel connected at one end to the aperture in the corresponding block and extending thereof inwardly along the etched surface wherein the channel receives and fixedly engages the fishing hook.

In yet a third exemplary embodiment, the present invention provides a method for holding and facilitating the threading of at least one fishing-hook having an eye. The method includes securing the fishing-hook in at least one hook-receiving channel of a clam-shell housing wherein the eye remaining external to the housing and then threading the eye of the fishing-hook.

The aforementioned summary descriptions were intended to only provide an overview of the exemplary embodiments of the present invention. A more detailed understanding of these features, and of additional features, objects, and advantages of the present invention will be provided to those skilled in the art from a consideration of the following Detailed Description of the Invention, taken in conjunction with the accompanying Drawings, which will now first be described briefly.

BRIEF DESCRIPTION OF THE DRAWINGS

FIG. 1 is a perspective view of an exemplary fishing-hooks holder of the present invention illustrating various structural and functional aspects thereof.

FIG. 2 is a perspective view of an exemplary fishing-hooks holder of the present invention illustrating various structural and functional aspects thereof.

FIG. 3 is a perspective view of an exemplary embodiment of the fishing-hook holder of the present invention in a closed position.

FIG. 4 is an additional perspective view of an exemplary embodiment of the fishing-hook holder of the present invention in a closed position.

DETAILED DESCRIPTION OF THE INVENTION

Figure 5:
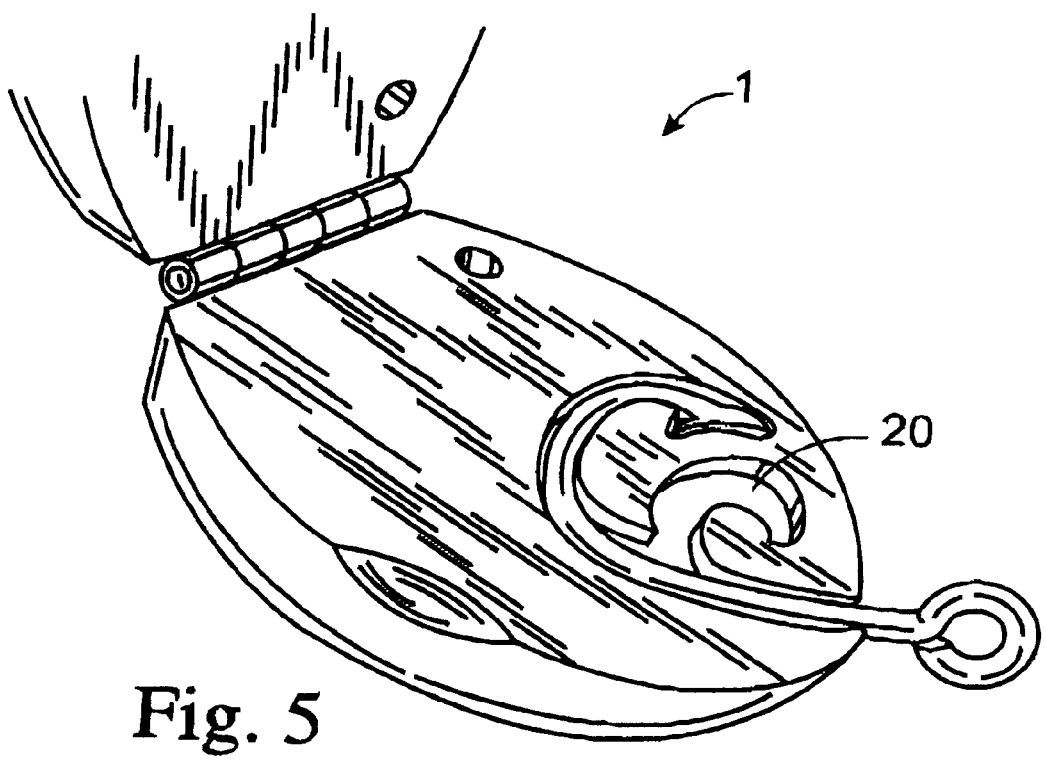
FIG. 5 is another view of an exemplary fishing-hook holder of the present invention.

The present invention is a fishing-hook holder and threading device and associated method to hold a fishing-hooks in place to facilitate the threading the fishing-hook.

As illustrated in FIG. 1, the device of the present invention includes a clam-shell housing 1 having a pair of opposing blocks 1a and 1b. Blocks 1a and 1b have corresponding surfaces 11a and 11b that are opposing surfaces relative to each other. The clam-shell housing 1 further includes at least one of apertures 18 and 19 that are formed at a periphery of each of their corresponding opposing surfaces 11a and 11b. In addition, hook-receiving channels 20a and 20b are etched into each of said opposing surfaces and in the substantial shape of fishing-hooks so to receive and fixedly engage the fishing hook. Channels 20a and 20b are each connected at one end to their corresponding apertures 18 and 19 in the corresponding blocks 1a and 1b and extend thereof inwardly along the corresponding surfaces 11a and 11b.

In an exemplary embodiment, blocks 1a and 1b are joined together by the hinge mechanism 17 in order to facilitate the closing of the clam-shell housing 1. It should be noted however, that the hinge mechanism 17 is not essential to the operations of the present invention and any closing mechanism known to those skilled in the art that can effectively facilitate the closing of clam-shell housing 1 may also be used in the place of a hinge.

The clam-shell housing 1 also includes indenture 15 consisting of a pair of indentures 15a and 15b located on an outer edge of the corresponding opposing surfaces 11a and 11b and in substantial adjoining relative to each other in the blocks 1a and 1b to facilitate the opening of the clam-shell housing 1.

Additional features of clam-shell housing 1 are a pair of non-opposing surfaces 30a and 30b in the corresponding blocks 1a and 1b, and the hollow conduit 10 that courses between the non-opposing surfaces 30a and 30b. The hollow conduit 10 provides a passageway for a fastening mechanism such as a thread or chain to pass through, thereby facilitating the fastening of the clam housing to an external object by the user. The user can for example secure the clam housing by fastening the thread to the chain to his belt while fishing to reduce the risk of losing the clam-shell housing which may otherwise accidentally slip out of his pocket or hands and fall into the river.

The structural features of the hook-receiving channel 20 will now be discussed in greater detail. As shown in FIG. 1, the hook-receiving channel 20, presented in two forms in each of blocks 1a and 1b for illustrative purposes, have a corresponding main channel 20a and 20b etched in a curved or straight form, and curved channel sets 21a and 21b having barb-engaging cavity-ends 22a and 22b. In an exemplary embodiment, at least one of main channels 20a and 20b, such as main channel 20b used here for simplicity, is substantially shaped in the form of a fishing-hook shank and extends from the aperture 18 to the curved channel set 21b. As illustrated in FIG. 1, each member of the curved channel set 21b is substantially shaped in the form of a fishing-hook bend and radially extends from main channel 20b to its corresponding barb-engaging cavity-end set 22b member.

The functional features of the clam-shell housing 1 will now be discussed in FIGS. 2 and 3 in conjunction with FIG. 1. As illustrated in FIG. 2, a typical fish-hook 25 having an eye member 25a, a shank member 25b, a bend member 25d and a barb member 25c is placed inside the hook-receiving channel 20 such as the one in block 1b. As described above, the hook-receiving channel 20 is etched into the surface 11b substantially in the form of a fishing-hook, with each of its member 20b–22b substantially shaped to the corresponding parts of a fish-hook. one advantage of the foregoing feature of the present invention over the prior art is the present invention's ability to receive and fixedly engage the fishing hook within the snug confines of the receiving channel 20. In this way, the receiving channel restricts the fishing-hook from angular movement along the plane of the surface 11b. Other advantages of the present invention over the prior art include the use of multiple curved channels 21b extending out at different radii FIG. 3 illustrates additional functional features of the present invention. As illustrated, the clam-shell housing 1 holding fishing hook 25 is set to a closed position, by the pivotal rotation along hinge 17. When in a closed position, the opposing surfaces 11a and 11b are adjoined, effectively fixedly immuring the portions of the fishing-hook 25 received in channel 21b. Thus opposing block 1a acts to further restrict the movement of the fishing-hook 25, such as from axial rotation along its shank 25b and also of angular movement relative to the plane of opposing surfaces 11a and 11b. In addition, as illustrated in FIG. 3 aperture 18 and 19 in both blocks 1a and 1b are advantageously placed in offset positions relative to one another in the opposing surfaces 11a and 11b to further minimize the movement of the fishing-hook 25 near the apertures 18 and 19. Furthermore, receiving channels 20a and 21b in opposing blocks 1a and 1b are advantageously paced in a substantially offset opposition relative to each to further minimize the internal movement of the fishing-hook 25 in the channel 20 within the clam-shell housing 1.

The foregoing feature allows for the present invention to be used for holding a variety of different fishing-hooks of different sizes and shapes. Channels of different depths and width may also be used to accommodate fishing-hooks with varying axial diameters, along with similarly dimensionally different barb-engaging cavity-ends to accommodate different barb sizes.

It should be emphasized that the apertures 18 and 19 need not be rectangular as illustrated. Rather, it is contemplated as being within the scope of the present invention to form apertures 18 and 19 in a wide variety of geometric shapes such as polygons and annular designs.

As further illustrated in FIG. 3, the clam-shell housing 1 encases a substantial portion of the shank 25b to maximize restriction of its movement but also allowing. the eye 25a to remain external to the housing for facilitated threading by the accessing user.

Other features of the clam-shell housing 1 are also illustrated in FIG. 3 in form of non-opposing surfaces 30a and 30b and one of the external openings of hollow conduit 10. In an exemplary embodiment of the present invention, at least one of the opposing surfaces 30a and 30b is a substantially planar surface to allow for both a more secure handling of the housing such as during threading, and more stable resting of the clam-shell housing on another surface, such as on a pier or boat seat when not in use.

FIG. 4 is an additional perspective view of an exemplary embodiment of the fishing-hook holder of the present invention in a closed position.

FIG. 5 is another view of an exemplary fishing-hook holder of the present invention, illustrating another possible shape for hook-receiving channel 20.

Figure 6:
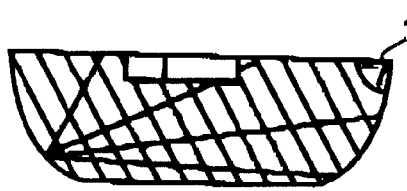
FIG. 6 is a cross-sectional view of an exemplary embodiment of the fishing-hook holder of the present invention generally corresponding to that of FIG. 2.
Figure 7:
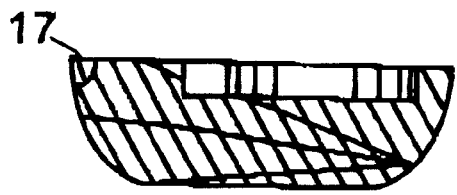
FIG. 7 is a cross sectional view of an exemplary embodiment of the fishing-hook holder of the present invention generally corresponding to that of FIG. 2.

For additional understanding of this construction, FIGS. 6 and 7 provides a cross-sectional view illustrating these details.

It should be emphasized that the clam-shell housing 1 need not be formed as the generally circular structure of FIG. 4 in order to come within the scope and teachings of the present invention. Rather, it is contemplated as being within the scope of the present invention to form clam-shell housing 1 in a wide variety of geometric shapes ranging from simple bars and crescents through polygons, circles, and the like. When formed into the generally circular shape shown, clam-shell housing 1 defines or provides a central location for at least one or for a plurality of channels 20. It should be noted that only the fundamental features of clam-shell housing 1 are illustrated in the FIGS. 1–7. Those skilled in the art will appreciate that additional surface features, shapes, and details may be provided as desired, including projecting knobs, curbs, tabs, buttons, or the like.

In an exemplary embodiment of the present invention, clam-shell housing 1 is made of a buoyant material to minimize the risk of loss of clam-shell housing 1 when accidentally dropped in the water. Additionally, clam-shell housing 1 can be formed of any commercially available material having buoyancy and resistance to the elements to function in its intended environment as a fishing-hook holder and threading device. Exemplary materials include industrial grade composites such as plastic polymers and hollowed stainless steal. In the exemplary embodiment of fishing-hook holder and threading device, clam-shell housing 1 is formed of wood. However, it should be emphasized that this is not a limiting feature of the present invention and that alternative materials may be utilized as appropriate.

Other embodiments, features, and advantages of the present invention will be apparent to those skilled in the art from a consideration of the foregoing specification as well as through practice of the invention and alternative embodiments and methods disclosed herein. Therefore, it should be emphasized that the specification and examples are exemplary only, and that the true scope and spirit of the invention is limited only by the following claims.

What is claimed is:

1. A fishing-hook holder and threading device comprising:
    a) a clam-shell housing for a fishing hook, said housing having a pair of opposing first and second blocks, said fishing hook comprising an eye, a shank, a barb, and a bend wherein said shank extends from said eye to said bend, and said bend curving from said shank to said barb;
    b) a pair of opposing first and second surfaces, said first opposing surface in said first block and said second opposing surface in said second block;
    c) at least one aperture formed at a periphery of each of said opposing surfaces; and
    d) at least one hook-receiving channel etched in each of said opposing surfaces in the shape of said fishing-hook, said channel connected at one end to said aperture in the corresponding block and extending thereof inwardly along said etched surface, said channel comprising a main-stem channel shaped in the form of said shank, said channel further comprising a plurality of curved channels each having a corresponding barb-engaging cavity-end and different channel depths from each other wherein said main-stem channel extends from said aperture to said curved channels, each of said curved channels being shaped in the form of said bend and radially branching from said main-stem channel and extending to said corresponding barb-engaging cavity-end wherein said channel receives and fixedly engages said shank, barb, and bend of said fishing hook.

2. The device of claim 1 wherein said blocks are hingedly connected to each other.

3. The device of claim 1 wherein said eye is placed external to said clam-shell housing.

4. The device of claim 1, wherein said opposing blocks further comprising a first indenture located on an outer edge of said first surface and a second indenture located on an outer edge of said second surface wherein said first and second indentures are adjoined relative to each other in said blocks to facilitate the opening of said clam-shell housing.

5. The device of claim 1, said clam-shell housing further comprising:
    a) a pair of non-opposing first and second surfaces, said first non-opposing surface in said first block and said second non-opposing surface in said second block; and
    b) at least one hollow conduit extending from said first non-opposing surface to said second non-opposing surface.

6. The device of claim 1, wherein at least one of said first and second non-opposing surfaces is a flat planar surface.

7. The device of claim 1, wherein said aperture is annular.

8. The device of claim 1, wherein said aperture is angular.

9. The device of claim 1 wherein each said aperture formed at said periphery of each of said opposing surfaces is in an offset position relative to another said aperture formed at said periphery of the other opposing surface.

10. The device of claim 1, wherein each said hook-receiving channel in each opposing block is in an offset position relative to each channel in the other opposing block.

11. The device of claim 1, wherein said clam-shell housing restricts said fishing-hook from axial rotation along said shank.

12. The device of claim 1, wherein said clam-shell housing restricts said fishing-hook from angular movement relative to a plane of said opposing surfaces.

13. The device of claim 1, wherein said device is composed of a buoyant material.

14. The device of claim 13, wherein said buoyant material is a wood composite material.

15. The device of claim 13, wherein said buoyant material is a plastic composite material.

16. A fishing-hook holder and threading device comprising:
    a) a clam-shell housing for a fishing hook, said housing having a pair of opposing first and second blocks, said fishing hook comprising an eye, a shank, a barb, and a bend wherein said shank extends from said eye to said bend, and said bend curving from said shank to said barb;
    b) a pair of opposing first and second surfaces, said first opposing surface in said first block and said second opposing surface in said second block;
    c) at least one aperture formed at a periphery of each of said opposing surfaces; and
    d) at least one hook-receiving channel etched in each of said opposing surfaces in the shape of said fishing-hook, said channel connected at one end to said aperture in the corresponding block and extending thereof inwardly along said etched surface, said channel comprising a main-stem channel shaped in the form of said shank, said channel further comprising a plurality of curved channels each having a corresponding barb-engaging cavity-end wherein said main-stem channel extends from said aperture to said curved channels, each of said curved channels being shaped in the form of said bend and radially branching from said main-stem channel at different radii from each other and extending to said corresponding barb-engaging cavity-end wherein said channel receives and fixedly engages said shank, barb, and bend of said fishing hook.

17. A fishing-hook holder and threading device comprising:
   a) a clam-shell housing for a fishing hook, said housing having a pair of opposing first and second blocks, said fishing hook comprising an eye, a shank, a barb, and a bend wherein said shank extends from said eye to said bend, and said bend curving from said shank to said barb;
   b) a pair of opposing first and second surfaces, said first opposing surface in said first block and said second opposing surface in said second block;
   c) at least one aperture formed at a periphery of each of said opposing surfaces; and
   d) at least one hook-receiving channel etched in each of said opposing surfaces in the shape of said fishing-hook, said channel connected at one end to said aperture in the corresponding block and extending thereof inwardly along said etched surface, said channel comprising a main-stem channel shaped in the form of said shank, said channel further comprising a plurality of curved channels each having a corresponding barb-engaging cavity-end wherein said main-stem channel extends from said aperture to said curved channels, each of said curved channels being shaped in the form of said bend and radially branching from said main-stem channel and extending to said corresponding barb-engaging cavity-end, at least one of said curved channels radially branching from said main-stem channel at a different point along said main-stem channel than others, wherein said channel receives and fixedly engages said shank, barb, and bend of said fishing hook.

18. A fishing-hook holder and threading device comprising:
   a) a clam-shell housing for a fishing hook, said housing having a pair of opposing first and second blocks, said fishing hook comprising an eye, a shank, a barb, and a bend wherein said shank extends from said eye to said bend, and said bend curving from said shank to said barb;
   b) a pair of opposing first and second surfaces, said first opposing surface in said first block and said second opposing surface in said second block;
   c) at least one aperture formed at a periphery of each of said opposing surfaces; and
   d) at least one hook-receiving channel etched in each of said opposing surfaces in the shape of said fishing-hook, said channel connected at one end to said aperture in the corresponding block and extending thereof inwardly along said etched surface, said channel comprising a main-stem channel shaped in the form of said shank, said channel further comprising a plurality of curved channels each having a corresponding barb-engaging cavity-end wherein said main-stem channel extends from said aperture to said curved channels, at least one of said curved channels having a different length than others, each of said curved channels being shaped in the form of said bend and radially branching from said main-stem channel and extending to said corresponding barb-engaging cavity-end wherein said channel receives and fixedly engages said shank, barb, and bend of said fishing hook.

19. A fishing-hook holder and threading device comprising:
   a) a clam-shell housing for a fishing hook, said housing having a pair of opposing first and second blocks, said fishing hook comprising an eye, a shank, a barb, and a bend wherein said shank extends from said eye to said bend, and said bend curving from said shank to said barb;
   b) a pair of opposing first and second surfaces, said first opposing surface in said first block and said second opposing surface in said second block;
   c) at least one aperture formed at a periphery of each of said opposing surfaces; and
   d) at least one hook-receiving channel etched in each of said opposing surfaces in the shape of said fishing-hook, said channel connected at one end to said aperture in the corresponding block and extending thereof inwardly along said etched surface, said channel comprising a main-stem channel shaped in the form of said shank, said channel further comprising a plurality of curved channels each having a corresponding barb-engaging cavity-end wherein said main-stem channel extends from said aperture to said curved channels, at least one of said curved channels having a corresponding barb-engaging cavity-end of different size than others to accommodate different sized barb, each of said curved channels being shaped in the form of said bend and radially branching from said main-stem channel and extending to said corresponding barb-engaging cavity-end wherein said channel receives and fixedly engages said shank, barb, and bend of said fishing hook.

* * * * *